(12) United States Patent
Qureshi et al.

(10) Patent No.: US 10,218,632 B2
(45) Date of Patent: Feb. 26, 2019

(54) INTELLIGENT CONTROL AND MANAGEMENT MATRIX, APPARATUS, SYSTEM, AND A METHOD THEREOF

(71) Applicant: International Communications Corp., Riverside, CA (US)

(72) Inventors: Salman H. Qureshi, Mission Viejo, CA (US); Keith M. Alexis, Riverside, CA (US)

(73) Assignee: International Communications Corp., Riverside, CA (US)

( * ) Notice: Subject to any disclaimer, the term of this patent is extended or adjusted under 35 U.S.C. 154(b) by 22 days.

(21) Appl. No.: 15/449,555

(22) Filed: Mar. 3, 2017

(65) Prior Publication Data

US 2017/0257321 A1 Sep. 7, 2017

Related U.S. Application Data

(60) Provisional application No. 62/303,624, filed on Mar. 4, 2016.

(51) Int. Cl.
*H04L 12/863* (2013.01)
*H04L 12/26* (2006.01)

(52) U.S. Cl.
CPC ...... *H04L 47/6215* (2013.01); *H04L 43/0894* (2013.01); *H04L 43/10* (2013.01)

(58) Field of Classification Search
CPC ......... H04L 47/10; H04L 47/30; H04L 47/11; H04L 47/12; H04L 47/35; H04L 47/32; H04L 12/5602; H04L 2012/5636; H04L 2012/5632

USPC ......... 370/229, 235, 232, 233, 234, 395.41, 370/395.42, 411, 412, 349, 380
See application file for complete search history.

(56) References Cited

U.S. PATENT DOCUMENTS

| | | | | |
|---|---|---|---|---|
| 6,067,301 | A * | 5/2000 | Aatresh | H04L 47/10 370/418 |
| 7,002,980 | B1 * | 2/2006 | Brewer | H04L 47/10 370/229 |
| 2004/0213156 | A1 * | 10/2004 | Smallwood | H04L 47/10 370/232 |

* cited by examiner

*Primary Examiner* — Brenda H Pham
(74) *Attorney, Agent, or Firm* — Palo Alto Legal Group, P.C.; Omair M. Farouqui, Esq.; Aziz M. Ahsan, Esq.

(57) ABSTRACT

The present invention relates generally to an intelligent control and management matrix (ICMM), apparatus, system, and a method thereof. More particularly, the invention encompasses an inventive intelligent control and management matrix (ICMM), or icXengine, which is designed to help resolve a consistent issue seen in packet transmission technology, such as, for example, Ethernet technology, which is called contention. In one aspect the inventive ICMM, monitors, polls, and acts based on traffic flow information, to reduce contention, and to allow more data, video, voice, user content, etc., to pass through the Ethernet system. Thus, the inventive ICMM or icXengine allows for decision making, and traffic policing, based on bandwidth analytics, and a predetermined formulation or criteria.

20 Claims, 4 Drawing Sheets

INTELLIGENT CONTROL AND MANAGEMENT MATRIX, APPARATUS, SYSTEM, AND A METHOD THEREOF

CROSS-REFERENCE TO RELATED APPLICATION

The instant patent application claims priority to and the benefit of U.S. Provisional Patent Application Ser. No. 62/303,624, filed on Mar. 4, 2016, titled "Intelligent Control and Management Matrix, Apparatus, System, and a Method Thereof," the entire disclosure of which provisional application is incorporated herein by reference.

FIELD OF THE INVENTION

The present invention relates generally to an intelligent control and management matrix (ICMM), apparatus, system, and a method thereof. More particularly, the invention encompasses an inventive intelligent control and management matrix (ICMM), or icXengine, which is designed to help resolve a consistent issue seen in packet transmission technology, such as, for example, Ethernet technology, which is called contention. In one aspect the inventive ICMM, monitors, polls, and acts based on traffic flow information, to reduce contention, and to allow more data, video, voice, user content, etc., to pass through the Ethernet system. Thus, the inventive ICMM or icXengine allows for decision making, and traffic policing, based on bandwidth analytics, and a predetermined formulation or criteria.

PURPOSES AND SUMMARY OF THE INVENTION

The invention is a novel intelligent control and management matrix, apparatus, system, and a method thereof.

Therefore, one purpose of this invention is to provide an apparatus which allows for monitoring, polling, and acting based on traffic flow information, to reduce contention, and to allow more data, video, voice, user content, etc., to pass through an Ethernet system.

In one aspect this invention comprises a method for controlling data packet transmission in a data network of a communication system comprising:

defining a first level of packet transmission rate, which first level establishes a queue system for lower priority data packets based on one of at least one first criteria calculations, and at least one second criteria calculations;

defining a second level of packet transmission rate, which second level diverts lower priority data packets into said queue system based on type of data packet;

defining a third level of packet transmission rate, which third level diverts lower priority data packets into said queue system based on protocol precedence of data packet;

transmitting data packets over a data network;

determining rate of data packet transmission over said data network;

determining type of data packet transmitted over said data network;

responsive to a packet transmission rate exceeding said first level, establishing a queue system for lower priority data packets based on said one of at least one first criteria calculations, and at least one second criteria calculations;

responsive to a packet transmission rate exceeding said second level, diverting lower priority data packets into said queue system based on type of data packet; and responsive to a packet transmission rate exceeding said third level, diverting lower priority data packets into said queue system based on protocol precedence of data packet.

In another aspect this invention comprises a system for controlling data packet transmission in a data network of a communication system comprising:

defining a first level of packet transmission rate, which first level establishes a queue system for lower priority data packets based on one of at least one first criteria calculations, and at least one second criteria calculations;

defining a second level of packet transmission rate, which second level diverts lower priority data packets into said queue system based on type of data packet;

defining a third level of packet transmission rate, which third level diverts lower priority data packets into said queue system based on protocol precedence of data packet;

transmitting data packets over a data network;

determining rate of data packet transmission over said data network;

determining type of data packet transmitted over said data network;

responsive to a packet transmission rate exceeding said first level, establishing a queue system for lower priority data packets based on said one of at least one first criteria calculations, and at least one second criteria calculations;

responsive to a packet transmission rate exceeding said second level, diverting lower priority data packets into said queue system based on type of data packet; and responsive to a packet transmission rate exceeding said third level, diverting lower priority data packets into said queue system based on protocol precedence of data packet.

In yet another aspect this invention comprises a non-transitory computer-readable storage medium with an executable program application stored thereon, the program application configured for controlling data packet transmission in a data network, the program application configured to be accessible over a communications network, wherein the program application instructs a computer processor to perform the following steps of:

defining a first level of packet transmission rate, which first level establishes a queue system for lower priority data packets based on one of at least one first criteria calculations, and at least one second criteria calculations;

defining a second level of packet transmission rate, which second level diverts lower priority data packets into said queue system based on type of data packet;

defining a third level of packet transmission rate, which third level diverts lower priority data packets into said queue system based on protocol precedence of data packet;

transmitting data packets over a data network;

determining rate of data packet transmission over said data network;

determining type of data packet transmitted over said data network;

responsive to a packet transmission rate exceeding said first level, establishing a queue system for lower priority data packets based on said one of at least one first criteria calculations, and at least one second criteria calculations;

responsive to a packet transmission rate exceeding said second level, diverting lower priority data packets into said queue system based on type of data packet; and responsive to a packet transmission rate exceeding said third level, diverting lower priority data packets into said queue system based on protocol precedence of data packet.

DETAILED DESCRIPTION

Figure 1:
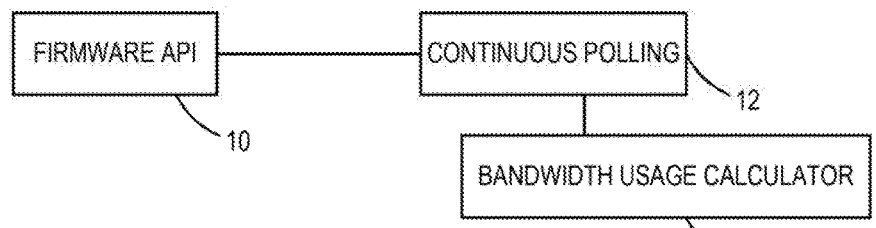
FIG. 1, illustrates an overview of a relationship between a firmware API and a bandwidth usage calculator.

The inventive intelligent control and management matrix, apparatus, system, and a method thereof will now be discussed with reference to FIGS. 1 through 6. Although the scope of the present invention is much broader than any particular embodiment, a detailed description of the preferred embodiment follows together with drawings. These drawings are for illustration purposes only and are not drawn to scale. Like numbers represent like features and components in the drawings.

As we move towards a super hyper-connected world, a different use for software emerges as a way to dynamically handling some of the various routing, management, and other data control points of the network. Adding some of the intelligence from the data plane, software-driven systems will unlock the pent up efficiency that is held-up by traditional data network ecosystems. Driven by demand, the networks have proven to be one of the few major bottlenecks as users demand more communication and content services. Software-driven networks provide tools to route and create virtual environments, and they continue to become a real option for optimization, deployment, and management for more network environments. Additionally, with the combination and consolidation at the client level has resulted in reducing the client network ecosystem footprint while obtaining additional savings and green energy advantages.

Therefore, a major impact in the adoption of technology as a medium for communication is its ease-of-use and interfacing between a gateway and a user or client. The icXengine is designed to make it easier for users to communicate to a gateway and to reduce contention. This invention provides a polling mechanism to provide priority or fast connectivity to a user, or a customer, or a device.

The current Ethernet methodology for transmissions is called Carrier Sense Multiple Access with Collision Detection (CSMA/CD).

Carrier Sense Multiple Access with Collision Detection (CSMA/CD) is a media access control method used most notably in local area networking (LAN) using early Ethernet technology. It uses a carrier sensing scheme in which a transmitting data station detects other signals while transmitting a frame, and stops transmitting that frame, transmits a jam signal, and then waits for a random time interval before trying to resend the frame. Carrier Sense Multiple Access with Collision Detection (CSMA/CD) is a modification of pure Carrier Sense Multiple Access (CSMA). Carrier Sense Multiple Access with Collision Detection (CSMA/CD) is used to improve CSMA performance by terminating transmission as soon as a collision is detected, thus shortening the time required before a retry can be attempted.

The assumption of Carrier Sense Multiple Access with Collision Detection (CSMA/CD) is that collisions will happen and therefore, retransmissions are necessary to ensure delivery of data packets. Since collisions were designed into the system to handle and ensure delivery of content, then the more devices and data on the local area network (LAN), the more chances for collisions which means contention will continue to grow. This is similar to like having too many cars in a traffic jam, and the easiest way to resolve the issue is to make a wider freeway to avoid traffic jams. However, to avoid such data jams on a network, the most common mode so far has been to increase the data speeds and go from, for example, to 10 mbps, to 100 mbps, to 1000 mbps, to 10 Gbps, and so on, or create more intelligence at nodes and at data level to handle the movement of data traffic.

There are several methods being used attempting to increase the existence of usable IP (Internet Protocol) bandwidth, such as, for example:

1. Upgrading the network is one method. Once a user's network slows (seemingly always around the 3-5 year upgrade cycle) they must upgrade to a higher capacity network.

2. Quality-of-Service (QoS), a standard with IEEE and primarily a static method has also been used and changed to be more efficient by various groups.

3. Software Defined Networking (SDN) theory is to remove all intelligence from the local area network (LAN) and centralizing it in a hardware or cloud controller which centrally tells local traffic where to go. This is designed for deployment efficiency and control.

Some other methods try to overlay more software to monitor the network and attempt to try and create efficiencies, but these simply add more data to an already crowded IP Data Network.

All the known methods accept the fact that Ethernet has to be filled with contention, dropped packets, and by accepting that, they design methods that try to go around contention. Also, these known methods attempt to deal with different issues than allowing more IP traffic onto the deployed network because as network vendors, they need to increase sales over time while not threatening existing install base. The other down side of the known existing methods is that they are primarily static in nature. For example, the Quality-of-Service (QoS) methodologies widely accepted in marketplace come up with a simple game plan prior to the game being played and cannot adjust accordingly to the changing nature of the realities on the ground. They try to employ more of a "One Size Fits All" methodology. Another reason for limited results is that the existing known methods were not designed as a tool for mass consumption. For example, SDN (Software Defined Networking) is really for Data Center and high end computing and deployment, and not for the small LAN (Local Area Network).

Figure 6:
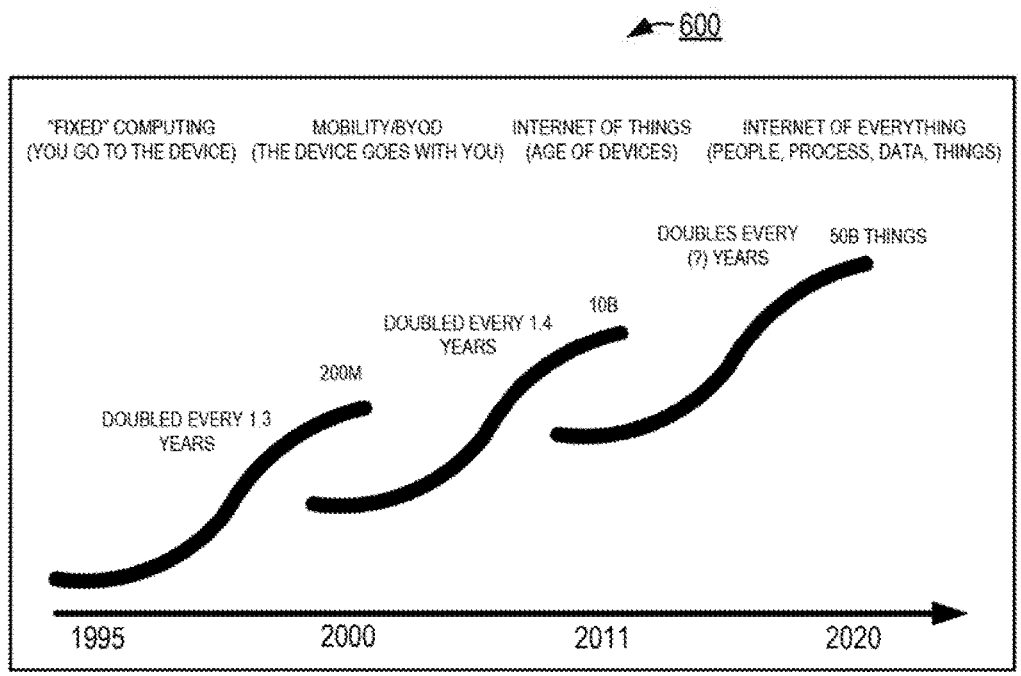
FIG. 6, illustrates how Internet of Things (IOT) continues to speed up over time, complexity of content, and type of use.

While the internal working processes are complex, the user interface and actions to set up the apparatus are very simple, as more clearly shown and described in FIGS. 1, through 6.

Some of the advantages provided by this invention are, for example, it is a software driven solution for an existing problem. It reduces time spent for set-up and deployment, as it is a simple interface, which substantially increases traffic flow. This invention also reduces the cost of preparation for networking installations, and thus reduces total operating expenditures. It provides a faster time to deployment by automating the hyper-terminal setup and connection, log in, along with the system status checks. It increases the use of higher end networking devices, and thus improves on performance and return on investment for a user or client. This invention also opens up the historically proprietary nature of vendor data networking devices to a faster configuration and setup.

The inventive ICMM or icXengine system or platform of this invention has value for various industry segments, such as, for example, it reduces client or user or device deployment times, and increases deployment efficiency, while reducing technical setup and training time and requirements. It also simplifies training for a third party vendor or installer, and reduces specialized trainings as it is substantially software driven.

The inventive ICMM or icXengine system or platform of this invention has also value for users or customers, as it reduces operational expenses due to lower installation costs, and it increases cash for capital expenditures. For a user or a customer or a device it also reduces down time and increased workable use time, and it has exponential value as the deployment increases in size and complexity. It also seeks to eliminate the complexity of user connection to their enterprise networking device or devices.

The industry value from this invention increases because as connectivity demands increases, the handling of the data traffic requires more complex systems and software. This inventive system reduces the complexity and barriers to handling those complex environments. Also, by reducing the initial complexity, this invention enables user to access higher end technology that then ensures delivery of their content.

FIG. 1, illustrates an overview of a relationship between a firmware application program interface (API) 10, and segments of the inventive icXengine comprised of polling module 12 and bandwidth usage calculator 14. The application program interface (API) 10, is a set of routines, protocols, and tools for building software applications. An API 10, specifies how software components should interact. As illustrated in FIG. 1, the inventive polling module of icXengine 12, does periodic polling 12, or continuous polling 12, via the firmware API 10 and uses a bandwidth usage calculator 14, to identify or classify the polling results 12.

Figure 2:
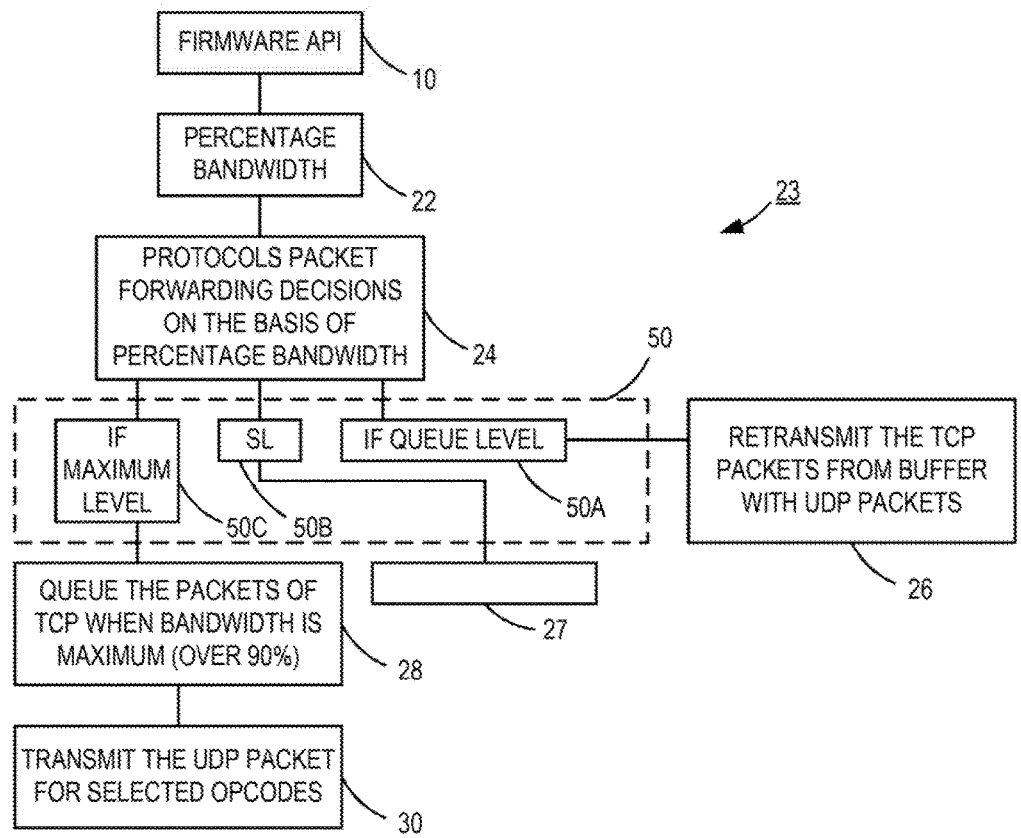
FIG. 2, illustrates a flow chart of an inventive icXengine module according to a first embodiment of the invention.

FIG. 2, illustrates a flow chart of a firmware application program interface (API) 10, module according to a first embodiment of the invention. The inventive icXengine through the firmware API interaction 10, gets the polling results 12, and then based on criteria 22, 50, which is preferably a percentage bandwidth 22, 50, allows the processing of the packets at step 24. For example, at step 24, the protocol forwarding decisions on the basis of percentage bandwidth 24, could be based on, for example, first level or Queue Level (QL-60%) 50A, second level or Stepped Level (SL-75%) 50B, third level or Maximum Level (ML-90%) 50C, to name a few, as established by an operator 223. Thus, for example, for first level or Queue Level (QL-60%) 50A, one would retransmit the Transmission Control Protocol (TCP) packets from buffer with User Datagram Protocol (UDP) packets at step 26. For the second level or Stepped Level (SL-75%) 50B, one could have a criteria that is in-between the first level or Queue Level (QL-60%) 50A, and the third level or Maximum Level (ML-90%) 50C, at step 27. For the third level or Maximum Level (ML-90%) 50C, one would queue the packets of Transmission Control Protocol (TCP) when bandwidth is maximum, for example, over 90 percent, at step 28. Thus, at step 28, one would transmit the User Datagram Protocol (UDP) packet for selected opcodes at step 30.

Figure 3:
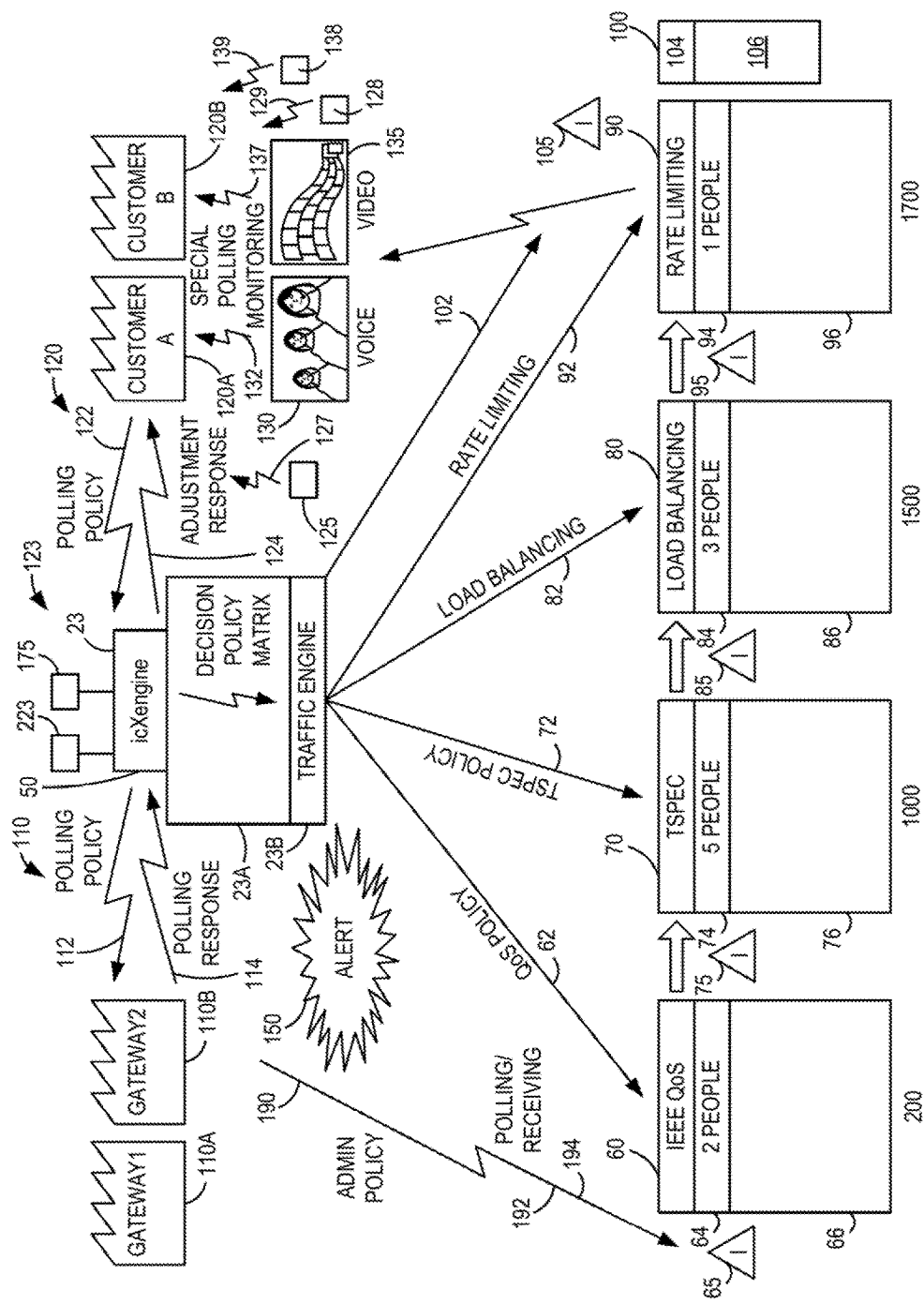
FIG. 3, illustrates an inventive ICMM or icXengine which constantly monitors, polls, measures, and adjusts the various inputs and outputs to decide how to handle traffic flows with respect to the environment and associated functional modules according to a second embodiment of the invention.

FIG. 3, illustrates an inventive intelligent control and management matrix (ICMM) 23, or icXengine 23, which constantly monitors, polls, measures, and adjusts the various inputs and outputs to decide how to handle traffic flows according to a second embodiment of the invention. The inventive intelligent control and management matrix (ICMM) 23, interacts with at least one gateway 110, using polling policy 112, and getting a polling response 114. For the purposes of illustration the at least one gateway 110, is shown as gateway 1 110A, and gateway 2 110B. It should be appreciated that the at least one gateway 110, could be firewall 110, or entry point 110, to name a few. The inventive intelligent control and management matrix (ICMM) 23, or icXengine 23, also interacts with at least one user 120, or client 120, or customer 120, or device 120, using polling policy 122, and adjusting response 124. For the purposes of illustration the at least one user 120, or client 120, or customer 120, or device 120, is shown as customer A 120A, and customer B 120B. The at least one user 120, or client 120, or customer 120, or device 120, could be using voice 130, via at least one communication means 132, and/or a video stream 135, via at least one communication means 137, and/or data 125, via at least one communication means 127, and/or a gaming stream 138, via at least one communication means 139, and/or a mission critical 128, via at least one communication means 129. The inventive intelligent control and management matrix (ICMM) 23, or icXengine 23, further comprises of a decision policy matrix 23A, and a traffic engine 23B. The inventive intelligent control and management matrix (ICMM) 23, or icXengine 23, does periodic or continuous polling 192, and receives the polling results 194, and then uses the admin policy 190, to implement the pre-established criteria for traffic or packet flow through the Ethernet system 123. The periodic or continuous polling 192, could be done for a Quality-of-Service (QoS) 60, via a Quality-of-Service policy 62, a Traffic Specification (TSPEC) 70, via a TSPEC policy 72, a Load Balancing 80, via a Load balancing policy 82, a Rate Limiting 90, via a rate limiting policy 92, other criteria 100, via another criteria policy 102. For the purposes of illustration for Quality-of-Service (QoS) 60, one could have 2 people 64, or devices 64, in the queue and the QoS polling & policing 66, could be done for example, 200 times, and/or for Traffic Specification (TSPEC) 70, one could have 5 people 74, or devices 74, in the queue and the Traffic Specification (TSPEC) polling and policing 76, could be done for example, 1000 times, and/or for Load Balancing 80, one could have 3 people 84, or devices 84, in the queue and the Load Balancing polling and policing 86, could be done for example, 0 times, and/or for Rate Limiting 90, and one could have 2 people 94, or devices 94, in the queue and the Rate Limiting polling and policing 96, could be done for example, 1500 times, and/or for others 100, one could have x number of people 104, or devices 104, in the queue and the other polling and policing 106, could be done for example, y number of times. For some application one could have a system alert 150, and/or Quality-of-service (QoS) alert 65, and/or Traffic Specification (TSPEC) alert 75, and/or Load Balancing alert 85, and/or Rate Limiting alert 95, and/or other alert 105. It should be appreciated that all of these alerts are taken into account by the inventive intelligent control and management matrix (ICMM) 23, or icXengine 23, and individual policies are adjusted accordingly.

Figure 4:
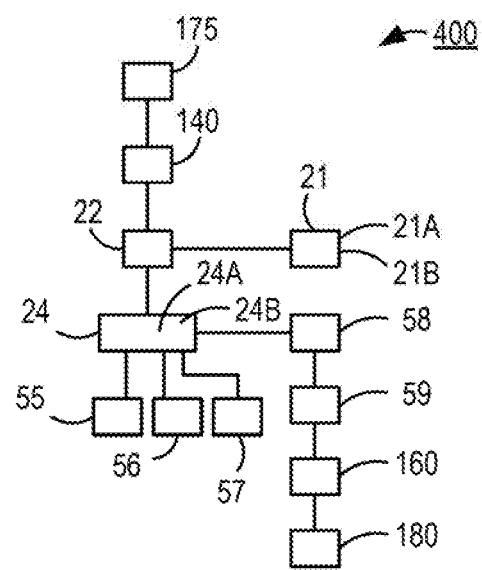
FIG. 4, illustrates a flow chart of some of the inventive components of the inventive ICMM or icXengine according to a third embodiment of the invention.

FIG. 4, illustrates a flow chart 400, of some of the inventive components of the inventive ICMM 23, or icXengine 23. The inventive intelligent control and management matrix (ICMM) 23, or icXengine 23, essentially has three key components, namely, analytics 140, decision making 160, and traffic policing 180.

As illustrated in flow chart 400, for the analytics component 140, at a first step 22, of the icXengine 23, one processes dynamic bandwidth calculation to calculate the total uplink bandwidth 21A, and total downlink bandwidth 21B, availability of the uplink/downlink link 21, and then one runs it intelligently until one has enough data points to run a statistical analysis on the total availability of the bandwidths 21A, 21B.

In a second step 24, the next algorithm of calculation of actual uplink 24A/downlink 24B, port utilization bandwidth is to be executed. This will calculate the bandwidth usage 24A, 24B, from the total bandwidth 24A, 24B, in percentage based on a predetermined formula 50. This formula 50, maybe applied to uplink 21A, downlink 21B, and combined bandwidth 21A, 21B, for specific utilization and key decisions that will be discussed later. At cold reboots this bandwidth check will be performed after a set interval of time or sample interval (SI) 55, allowing for the traffic patterns 56, to establish themselves to root out any incorrect data collection.

For the purposes of illustration in a very rudimentary implementation form, three levels of bandwidth Utilization Percentage (UP) 50, can be selected, as follows:

(a) First level or Queue Level (QL-60%) 50A;
(b) Second level or Stepped Level (SL-75%) 50B; and
(c) Third level or Maximum Level (ML-90%) 50C.

The calculations of the actual port bandwidth Utilization Percentage (UP) 50, can also be performed, for example, at set intervals of times 55, multiple times 55, of the day, to name a few. The calculations of the actual port bandwidth Utilization Percentage (UP) 50, can also be performed, for example, using a sample size (SS) 57. Once a utilization trend is noticed and learned by the inventive ICMM 23, or icXengine 23, the frequency of the checks 55, 57, etc., could be adjusted accordingly. It should be appreciated that the maximum polling time would be based on different real time bandwidth testing and results. After testing of real bandwidth one would set the general polling time 58, which will be workable for most all scenarios.

An overall evaluation and analysis of the high-level traffic flow patterns and protocols would be kicked-off right after reboot and would follow and utilize traffic flow protocols like, for example, sFlow 100, if applicable. The traffic pattern 56, evaluation decision will be updated on a real-time basis. Some part of this analysis may or may not be performed on an external device 175. After the initial analysis the forwarding decision of subsequent protocol packets will be based on the basis of Utilization Percentages (UP) 50, high-level traffic analytics 140, and deep sample packet analysis (SPA) 59.

As the Utilization Percentage 50, for example, crosses the Queue Level (QL) mark 50A, a lower level sample-packet analysis (SPA) 59, will start to kick off only at that moment to limit the overhead to a minimum. This will basically be a per packet inspection but at certain sample intervals and will be based on sampling theorems or formula 50. This sample packet analysis 59, will be in addition to the high-level analytics 50, that were performed automatically from the cold boot as discussed earlier. This SPA 59, will also utilize the high-level analytics 59, in conjunction with the sampling theorems 50, to select the right sample size (SS) 57, and/or the sample interval (SI) 55. This is referred to as the analytics piece 140, of the inventive icXengine 23.

Precedence of protocols can now be set on the basis of bandwidth Utilization Percentages (UP) or formula 50. The precedence will be changed according to the bandwidth usage 21, on a real-time basis. This is the second phase of the inventive icXengine 23, design covering the decision making section 160.

When Utilization Percentages (UP) 50, reaches the second level or Stepped Level (SL) mark 50B, the first phase of Traffic Policing (TP) 180, and the third and final phase of inventive icXengine 23, design will come into effect. Here the complete non-real-time traffic User Datagram Protocol (UDP) type packets will start getting into, for example, FIFO (first in, first out) queues based on protocols 50, and a BandWidth allocation for them can now be enforced. This allocation 50, will be calculated on a real-time basis pivoting on the total available WAN link bandwidth 21, and the User Datagram Protocol (UDP) Packet Type Queue (PTQ) it belongs to. All other application specific User Datagram Protocol (UDP) session packets like DHCP etc., packets will still be allowed through without being put into queues.

When bandwidth 21, consumption is above the third level or Maximum Level limit 50C, then the next phase of traffic policing (TP) 180, will kick into effect. Certain Transmission Control Protocol (TCP) packets will be queued in a different buffer for later sequenced and/or selective transmission. Also when all real-time User Datagram Protocol (UDP) packets come, then precedence level of User Datagram Protocol (UDP) packets will be checked against the precedence protocol 50, set in place. For instance, when User Datagram Protocol (UDP) packets of voice 130, and User Datagram Protocol (UDP) packets of other real time transmission 135, arrive at the same time, then the precedence level 50, is checked and accordingly executed.

Transmission Control Protocol (TCP) buffer length per type of packet and protocol will have to be set accordingly not to drop sessions altogether. A deep TCP packet inspection 59, is in place to identify all new session creation requests based on the application to be used. All application creation request/reply TCP packets will be deemed higher priority and allowed to pass through while the keep-alive TCP packets of existing sessions will be put in the buffer based on their max timeout values. A Fair Queuing or round robin type mechanism is put in place for this buffer so these packets or a selection of these packets are forwarded after max peak wait time (PWT) in the queue. The peak wait time (PWT) formula will be expanded up on later as it depends up on the type of session and application that the TCP packets belong to. All non-real-time User Datagram Protocol (UDP) data packets 125, will also follow a fair queuing/round robin mechanisms and associated bandwidth 21, will be allocated for them as well for their particular queue.

After bandwidth level 21, comes back below the second level or Stepped Level (SL) 50B, packets that were queued on the buffer will start forwarding normally again and no new packets will be placed in any queues.

All of the icXengine 23, mechanisms are designed not to replace but to complement the legacy QoS 60, and bandwidth management processes in place. Any traffic that matches a typical QoS rule or policy 62, will be allowed to go through according to the priority set in place for that type of traffic. Alternatively and preferably, the user 120, can further enhance the network performance 123, by layering the icXengine 23, processes on top of the legacy QoS rules or policy 62, configured in place.

For the purposes of illustration let us assume that we are operating below the first level or Queue Level (QL) 50A, and hence all types of traffic or data packet transmission is allowed to go through. The data network or system 123, is utilizing the high level traffic pattern or data packet transmission analysis to see and create some base criteria for what is anticipated. Once the traffic or data packet transmission goes above the first level or Queue Level (QL) 50A, the system 123, starts the inventive ICMM 23, or icXengine 23, calculations based on a prior high-level analytics that have already been stored in the system 123, by an operator 223, and decide on a sample packet analysis (SPA) 59, for packet level analytics based on a calculated sample size (SS) 57, and/or sample interval (SI) 55. Based on these calculations, the inventive ICMM 23, or icXengine 23, kicks in the decision making process and starts creating queues.

Now as the traffic or data packet transmission goes above the second level or Stepped Level (SL) SOB, the icXengine traffic policing 66, 76, 86, 96, 106, kicks in and starts diverting the lower priority traffic or data packet transmission into those queues in a manner which is according to type of packets being received. The decision engine 23, at this point also starts calculating the bandwidth that this lowest priority traffic or data packet transmission will be allowed. This lowest priority traffic or data packet transmission is typically the common web browsing traffic, email traffic, social media traffic, and other peer-to-peer/peer-to-multi-peer traffic 125, sharing type, and is mostly comprised of User Datagram Protocol (UDP) packets. However, the higher priority traffic 128, 130, 135, 138 continues to flow without any contention in the second level or Stepped Level 50B, phase.

When the overall traffic or data packet transmission starts to increase and it surpasses the third level or Maximum Level (ML) 50C, bandwidth usage, the next step of the icXengine policing 66, 76, 86, 96, 106, starts to be implemented. At this point as both User Datagram Protocol (UDP) and Transmission Control Protocol (TCP) packets that arrive at the device for further processing are looked at and further segmentation of traffic or data packet transmission starts to happen on the basis of protocol precedence. In this case, the inspection extends to the type of application level to prioritize traffic or data packet transmission between different forms of real-time traffic 130, 135, 138, and other mission critical data 128. The lower protocol packet types 125, will now be placed into their own queues for phased transmissions. So, for example, if mission critical traffic or packet 128, voice traffic or packet 130, multi-media streaming traffic or packet 135, and some gaming application traffic or packet 138, comes in, mission critical traffic or packet 128, voice traffic or packet 130, and gaming traffic or packet 138, will pass through, but the multi-media streaming data traffic or packet 135, and/or signaling traffic will be placed in specialized priority queue buffers for all such session traffic that will allow it to go through at lower interval rates that has negligible effect to the user 120. Also in this case the TCP signaling keep-alive traffic or packets would start to queue in the buffer as well, but will be allowed to pass through in a manner that does not cause the session to timeout for that application.

As bandwidth starts to minimize and reaches below the third level or Maximum Level (ML) 50C, then at that point all the TCP packets and other real-time time traffic 130, 135, 138, and mission critical 128, which were queued in buffers will start forwarding without any additional interval. Once the bandwidth usage continues to drop and reaches below the second level or Stepped Level (SL) 50B, then all the other lower priority traffic 125, placed into those queues will start flowing normally rather than following the limited bandwidth allocated to that type of traffic. The monitoring of bandwidth will continuously poll to get real time usage so that the data monitoring and packet transmission can be adjusted in real time.

This way the real-time intelligent ICMM 23, or icXengine 23, mechanism put in place will be able to dynamically route traffic or data packet transmission according to the deep packet level analytics designed and put into place. All of the inventive ICM 23, or icXengine 23, mechanisms are not designed to replace the conventional QoS structures 60, in place but actually work in conjunction with the regular QoS 60, and ACL 110 type of rules configured by the network administrators 223. Since legacy configurable QoS 60, is only set on a per device basis, and it lacks the dynamics of the network traffic changes on a real-time basis, it falls short of the needs of the user 120, and to truly maximize the network performance to the peak level.

The inventive ICMM 23, or icXengine 23, is a scalable design that is actually replicated and enforced across all the products in the customer network through software push through and be controlled by a centralized cloud based system 175.

Figure 5:
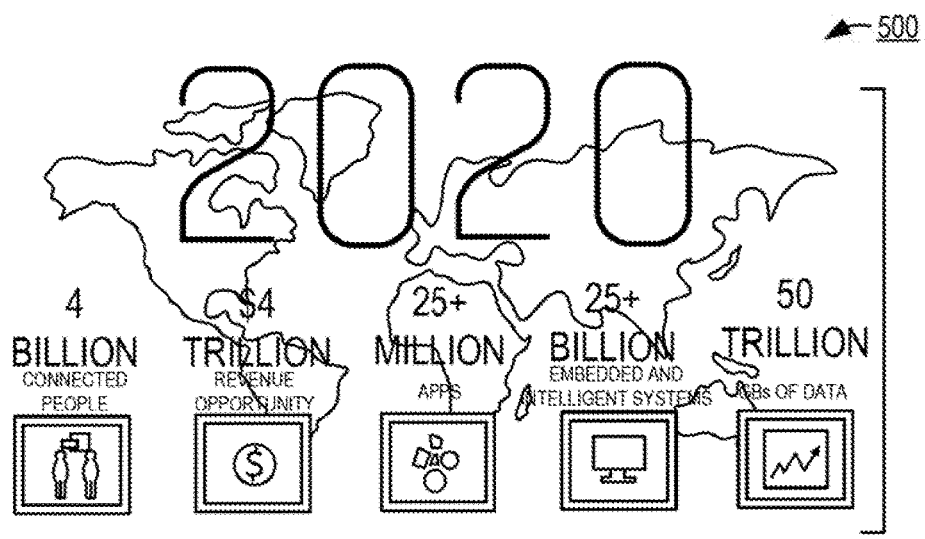
FIG. 5, illustrates how the IOT (Internet of Things) has a global impact.

FIG. 5, illustrates how the IOT (Internet of Things) 500, has a global impact.

FIG. 6, illustrates how Internet of Things (IOT) 600, continues to speed up over time, complexity of content, and type of use.

The inventive intelligent control and management matrix (ICMM) 23, or icXengine 23, is designed to help resolve a consistent issue seen in packet transmission technology, such as, for example, Ethernet technology, which is called contention. In one aspect the inventive ICMM 23, monitors 140, polls 160, and acts based on traffic flow information 180, to reduce contention, and to allow more data 125, voice 130, video 135, etc. to pass through the Ethernet system 123.

The inventive ICMM 23, or icXengine 23, uses various IEEE features for traffic management, such as, for example, Quality-of-Service (QoS) 60, Traffic Specification (TSPEC) 70, Load Balancing 80, Rate Limiting 90, and others 100, such as, for example, sFlow 100, Bandwidth Shaping 100, to name a few, to be able to avoid as many collisions, thus enabling more packets through the LAN 123, and on to their destination. This is accomplished by using the inventive software to monitor, manage, and dynamically change traffic flows which reduces contention. The reduction of contention results in fewer collisions and an increase in usable bandwidth. Switched Ethernet can also be used to solve some of these issues, however the explosion of mobility and Wi-Fi combined with the Internet of Things (IOT), increases the use of shared mediums carrier sense multiple access (CSMA), thus further compounding the issue. The inventive ICMM 123, also helps deal with these issues by centrally controlling data flows to reduce end point/user contention more quickly.

Another benefit of the inventive ICMM 23, or icXengine 23, is a simplification of management. As ICMM 23, utilizes the various features to ensure proper data flows, it alleviates the need for IT Admin to measure each advanced feature individually to decided how much of each features is needed to run an efficient LAN 123. Moreover, it more efficiently calculates, decides and changes parameters quickly to ensure dynamic adjustments, both big and small, to be made faster and more proactively.

The inventive ICMM 23, or icXengine 23, allows one to increase efficiency so as to allow more data traffic 125, 128,

130, 135, 138, users 120, and management 110, possible over the same networking ecosystem 123. This is very important in the age of the Internet of Things (IOT). IOT is the explosion of connectedness around the globe that continues to increase the volumes of data 125, 128, 130, 135, 138, users 120, devices 120, and interactions that happen over an IP Data Network 123. This Hyper-connectedness isn't just about communication between people 120, but Machine-to-Machine communication 120, is expected to outpace that of people by nearly 4 or 5 to 1. Therefore, the more efficient an IP Data infrastructure 123, the more communication it can allow to pass through it's network 123.

The inventive ICMM 23, or icXengine 23, is a holistic and heuristic engine 23, that polls, thinks, and then utilizes various methods to accomplish its optimization objectives. It's central objective it not to drop packets, so to that end, the application leverages already existing product features including but not limited to Quality-of-service (QoS) 60, Traffic Specification (TSPEC) 70, Load Balancing 80, and Rate Limiting 90, sFlow 100, among others to balance flows of data. This is also unique because used individually, these features attempt to allow better performance, but they do so based on IT administration established priority profiles, while the inventive ICMM 23, or icXengine 23, sees that ALL IP traffic 125, 128, 130, 135, 138, must get through the system 123, and balances transmissions vis-a-vis the other IP packets and against the usable bandwidth resources. It has capabilities to dynamically adjust the game plan on the go based on an ever changing nature of the network 123, at any given time of the day.

The inventive ICMM 23, or icXengine 23, is applicable on and for any IP data network ecosystem 123. It can exist on any device 120, that transmits or receives IP information and has to process that information using a set of processing tools such as Quality-of-service (QoS) 60, Load Balancing 80, to name a few.

The invention 23, allows the user 120, to reduce their cost per device 120, on their network 123. The ability to handle more devices 120, per access point 110, or switch 110, enables a better OpEx (Operation Expenses) cost for the user 120. It also allows for better service and delivery of more complex applications, such as, for example, data 125, mission critical data 128, voice over IP 130, streaming media 135, gaming sessions 138, to name a few.

The continued explosive growth of IOT 500, 600, depends on the transmission, processing and reception of content. Much like a freeway that becomes too clogged with car traffic, so can an IP data network suffer from too much content, devices, users 125, 128, 130, 135, 138, 120, trying to communicate at the same time. If information can't traverse the network 123, its value comes into question and has the potential to slow growth, revenue expansion, development, and can impact global economies.

The inventive ICMM 23, or icXengine 123, provides a method to alleviate traffic through the use of various tools (not just one method) to automate traffic, route traffic, speed/slow traffic, redirect traffic to different locations, and many other actively dynamic and intelligent traffic cop methods.

The inventive ICMM 23, or icXengine 23, is different because:

1. The invention 123, starts with the assumption that contention can/should be eliminated;
2. The invention 123, uses existing features 60, 70, 80, 90, 100, as part of the policy matrix as opposed to one or two;
3. The invention 123, focuses on all aspects of the communication traffic from Ingress/Egress, WAN/LAN, Analytics, Traffic heuristics, Feature Handling, to name a few;
4. The invention 123, works dynamically with the "current" network contention situation and perform a 'just-in-time' methodology of traffic shaping and prioritization.

This inventive ICMM 23, or icXengine 23, considers as many variables as possible to arrive at an optimal performance level for the IP Data Network 123. In addition, this invention reduces network contention and removes parts that would lessen the effect of the overall invention. Leaving parts or features out may result in omitting variables that might not impact just one network but could have a meaningful impact on other network designs.

It should be noted that with this invention pieces can be combined as long as the IP Data Traffic and IEEE standards can be combined, which means that the main parts of IP transmissions from ingress of packets, destination determination and routing to the egress, are standard but this invention can change if those objectives change.

The inventive ICMM 23, or icXengine 23, can be widely used by all points of IP Network interaction. For some applications the ICMM invention 23, could be integrated into the chip level processing. Integration into open standards would allow third party vendors to utilize the ICMM inventive technology 123. The more widely used the ICMM invention 123, the more areas of the Global IP Data ecosystem becomes efficient and that would allow more communication to take place.

This inventive ICMM 23, or icXengine 23, can be used with any Internet Protocol (IP) as part of its communication infrastructure. The ICMM invention 23, can also be used with any communication protocol in the world, just as the global communication standards continue to shift to TCP/IP leaving behind other standards like Token Ring, ArcNet, Sonet, Fiber Channel, and many others, to name a few.

The inventive ICMM 23, or icXengine 23, used in the present invention, may be implemented using one or more computers 175, executing software instructions. According to one embodiment of the present invention, the computer 175, having a screen 175, may communicate with a server 175, and client computer systems 175, that transmits and receives data over a computer network 123, or a fiber or copper-based telecommunications network 123. The steps of accessing, monitoring, and manipulating the flow of data, as well as other aspects of the present invention are implemented by central processing units (CPU) 175, in the server 175, and client computers 175, executing sequences of instructions stored in a memory 175. The memory 175, may be a random access memory (RAM), read-only memory (ROM), a persistent store, such as a mass storage device, or any combination of these devices. Execution of the sequences of instructions causes the CPU 175, to perform steps according to embodiments of the present invention 123.

The instructions may be loaded into the memory 175, of the server 175, or client computers 175, from a storage device 175, or from one or more other computer systems 175, over a network connection 123. For example, a client computer 175, may transmit a sequence of instructions to the server computer 175, in response to a message transmitted to the client over a network 123, by the server 175. As the server 175, receives the instructions over the network connection 123, it stores the instructions in memory. The server 175, may store the instructions for later execution, or it may execute the instructions as they arrive over the network connection 123. In some cases, the CPU may directly support the downloaded instructions. In other cases, the instructions may not be directly executable by the CPU 175, and may instead be executed by an interpreter that interprets the instructions. In other embodiments, hardwired circuitry may be used in place of, or in combination with, software instructions to implement the present invention 123. Thus tools used in the present invention are not limited to any specific combination of hardware circuitry and software, nor to any particular source for the instructions executed by the server or client computers. In some instances, the client and server functionality may be implemented on a single computer platform or an embedded firmware hardware device 175.

Thus, the present invention is not limited to the embodiments described herein and the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

Still further, while certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions.

It should be further understood that throughout the specification and claims several terms have been used and they take the meanings explicitly associated herein, unless the context clearly dictates otherwise. For example, the phrase "in one embodiment" as used herein does not necessarily refer to the same embodiment, though it may. Additionally, the phrase "in another embodiment" as used herein does not necessarily refer to a different embodiment, although it may. Thus, various embodiments of the invention may be readily combined, without departing from the scope or spirit of the invention.

While the present invention has been particularly described in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A method for controlling data packet transmission in a data network of a communication system comprising:
   defining a first level of packet transmission rate, which first level establishes a queue system for lower priority data packets based on one of at least one first criteria calculations, and at least one second criteria calculations;
   defining a second level of packet transmission rate, which second level diverts lower priority data packets into said queue system based on type of data packet;
   defining a third level of packet transmission rate, which third level diverts lower priority data packets into said queue system based on protocol precedence of data packet;
   transmitting data packets over a data network;
   determining rate of data packet transmission over said data network;
   determining type of data packet transmitted over said data network;
   responsive to a packet transmission rate exceeding said first level, establishing a queue system for lower priority data packets based on said one of at least one first criteria calculations, and at least one second criteria calculations;
   responsive to a packet transmission rate exceeding said second level, diverting lower priority data packets into said queue system based on type of data packet; and
   responsive to a packet transmission rate exceeding said third level, diverting lower priority data packets into said queue system based on protocol precedence of data packet.

2. The method of claim 1, wherein said at least one first criteria calculations are based on at least one sample size.

3. The method of claim 1, wherein said at least one second criteria calculations are based on at least one sample interval.

4. The method of claim 1, wherein said at least one first criteria calculations are based on at least one sample size, and wherein said at least one second criteria calculations are based on at least one sample interval.

5. The method of claim 1, wherein said data packets diverted into said queue system are removed from said queue system as packet transmission rate falls below said third level.

6. The method of claim 1, wherein said data packets diverted into said queue system are removed from said queue system as packet transmission rate falls below said third level and said second level.

7. The method of claim 1, wherein said determination of rate of data packet transmission over said data network and determination of type of data packet transmitted over said data network are performed by polling said data packets being transmitted over said data network at a rate using at least one third criteria selected from a group consisting of quality-of-service policy, traffic specification policy, load balancing policy, rate limiting policy, other policy, and combinations thereof.

8. The method of claim 1, wherein said data packets are selected from a group consisting of web browsing data packet, email data packet, social media data packet, peer-to-peer data packet, peer-to-multi-peer data packet, mission critical data packet, voice data packet, multi-media streaming data packet, video data packet, gaming application data packet, and combinations thereof.

9. The method of claim 1, wherein said defining of said first level of packet transmission rate, said defining of said second level of packet transmission rate, said defining of said third level of packet transmission rate is performed by an operator.

10. The method of claim 1, wherein said defining of said first level of packet transmission rate, said defining of said second level of packet transmission rate, said defining of said third level of packet transmission rate is done based on a percentage bandwidth.

11. A non-transitory computer-readable storage medium with an executable program application stored thereon, the program application configured for controlling data packet transmission in a data network, the program application configured to be accessible over a communications network, wherein the program application instructs a computer processor to perform the following steps of:
- defining a first level of packet transmission rate, which first level establishes a queue system for lower priority data packets based on one of at least one first criteria calculations, and at least one second criteria calculations;
- defining a second level of packet transmission rate, which second level diverts lower priority data packets into said queue system based on type of data packet;
- defining a third level of packet transmission rate, which third level diverts lower priority data packets into said queue system based on protocol precedence of data packet;
- transmitting data packets over a data network;
- determining rate of data packet transmission over said data network;
- determining type of data packet transmitted over said data network;
- responsive to a packet transmission rate exceeding said first level, establishing a queue system for lower priority data packets based on said one of at least one first criteria calculations, and at least one second criteria calculations;
- responsive to a packet transmission rate exceeding said second level, diverting lower priority data packets into said queue system based on type of data packet; and
- responsive to a packet transmission rate exceeding said third level, diverting lower priority data packets into said queue system based on protocol precedence of data packet.

12. The non-transitory computer-readable storage medium with an executable program application stored thereon of claim 11, wherein said at least one first criteria calculations are based on at least one sample size.

13. The non-transitory computer-readable storage medium with an executable program application stored thereon of claim 11, wherein said at least one second criteria calculations are based on at least one sample interval.

14. The non-transitory computer-readable storage medium with an executable program application stored thereon of claim 11, wherein said at least one first criteria calculations are based on at least one sample size, and wherein said at least one second criteria calculations are based on at least one sample interval.

15. The non-transitory computer-readable storage medium with an executable program application stored thereon of claim 11, wherein said data packets diverted into said queue system are removed from said queue system as packet transmission rate falls below said third level.

16. The non-transitory computer-readable storage medium with an executable program application stored thereon of claim 11, wherein said data packets diverted into said queue system are removed from said queue system as packet transmission rate falls below said third level and said second level.

17. The non-transitory computer-readable storage medium with an executable program application stored thereon of claim 11, wherein said determination of rate of data packet transmission over said data network and determination of type of data packet transmitted over said data network are performed by polling said data packets being transmitted over said data network at a rate using at least one third criteria selected from a group consisting of quality-of-service policy, traffic specification policy, load balancing policy, rate limiting policy, other policy, and combinations thereof.

18. The non-transitory computer-readable storage medium with an executable program application stored thereon of claim 11, wherein said data packets are selected from a group consisting of web browsing data packet, email data packet, social media data packet, peer-to-peer data packet, peer-to-multi-peer data packet, mission critical data packet, voice data packet, multi-media streaming data packet, video data packet, gaming application data packet, and combinations thereof.

19. The non-transitory computer-readable storage medium with an executable program application stored thereon of claim 11, wherein said defining of said first level of packet transmission rate, said defining of said second level of packet transmission rate, said defining of said third level of packet transmission rate is performed by an operator.

20. The non-transitory computer-readable storage medium with an executable program application stored thereon of claim 11, wherein said defining of said first level of packet transmission rate, said defining of said second level of packet transmission rate, said defining of said third level of packet transmission rate is done based on a percentage bandwidth.

* * * * *